United States Patent [19]
Kowalski

[11] Patent Number: 5,505,092
[45] Date of Patent: Apr. 9, 1996

[54] NON-INVASIVE FLUID CONDITION SENSING TRANSDUCER

[75] Inventor: Henry C. Kowalski, Grand Blanc, Mich.

[73] Assignee: Dinsmore Instrument Company, Flint, Mich.

[21] Appl. No.: 206,013

[22] Filed: Mar. 4, 1994

[51] Int. Cl.⁶ .................................................. G01L 7/02
[52] U.S. Cl. ........................................... 73/730; 338/4
[58] Field of Search ........................... 73/719, 720, 726, 73/730; 338/4

[56] References Cited

U.S. PATENT DOCUMENTS

| | | | |
|---|---|---|---|
| 2,420,148 | 5/1947 | Ostergren | 73/726 |
| 3,128,628 | 4/1964 | Lebow | 73/726 |
| 4,179,939 | 12/1979 | Price | 73/730 |
| 4,290,311 | 9/1981 | Brewer | 73/730 |
| 4,420,980 | 12/1983 | Dunemann et al. | 73/730 |
| 4,429,570 | 2/1984 | Tinder | 73/119 A |
| 4,535,631 | 8/1985 | Sinha et al. | 73/730 X |
| 4,541,284 | 9/1985 | Guagliumi et al. | 73/730 |
| 4,680,972 | 7/1987 | Wareham | 73/730 |
| 4,738,140 | 4/1988 | Kempf | 73/730 |
| 4,840,068 | 6/1989 | Mayhew, Jr. | 73/730 |
| 5,031,460 | 7/1991 | Kanenobu et al. | 73/730 |

Primary Examiner—Richard Chilcot
Assistant Examiner—Elizabeth L. Dougherty
Attorney, Agent, or Firm—C. J. Fildes & Co.

[57] ABSTRACT

A fluid condition sensing transducer includes a fluid containment device having a cylindrical side wall including an inner surface in contact with a fluid and an outer surface, a diaphragm integral with the side wall defined by a recessed portion of the side wall and extending between the inner surface and a recessed portion of the outer surface, and an in-situ, non-invasive sensor mounted on the recessed portion of the outer surface for sensing surface conditions of the diaphragm whereby the condition of the fluid in the containment device is sensed.

18 Claims, 2 Drawing Sheets

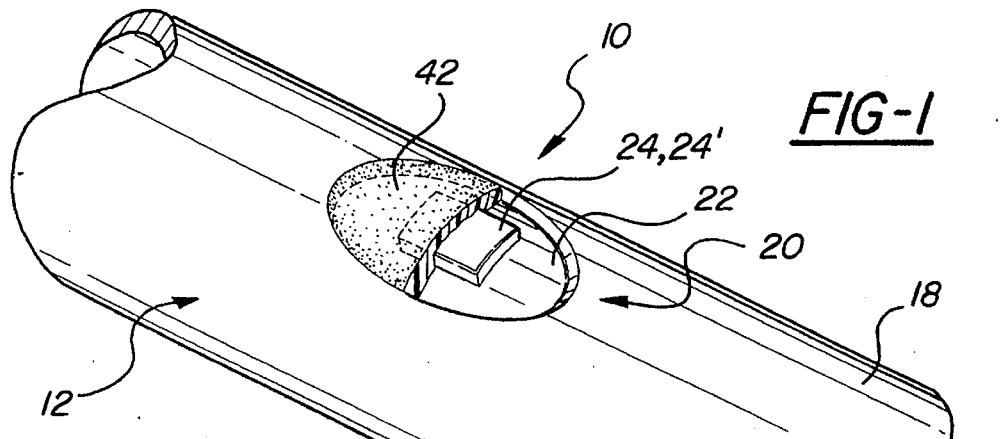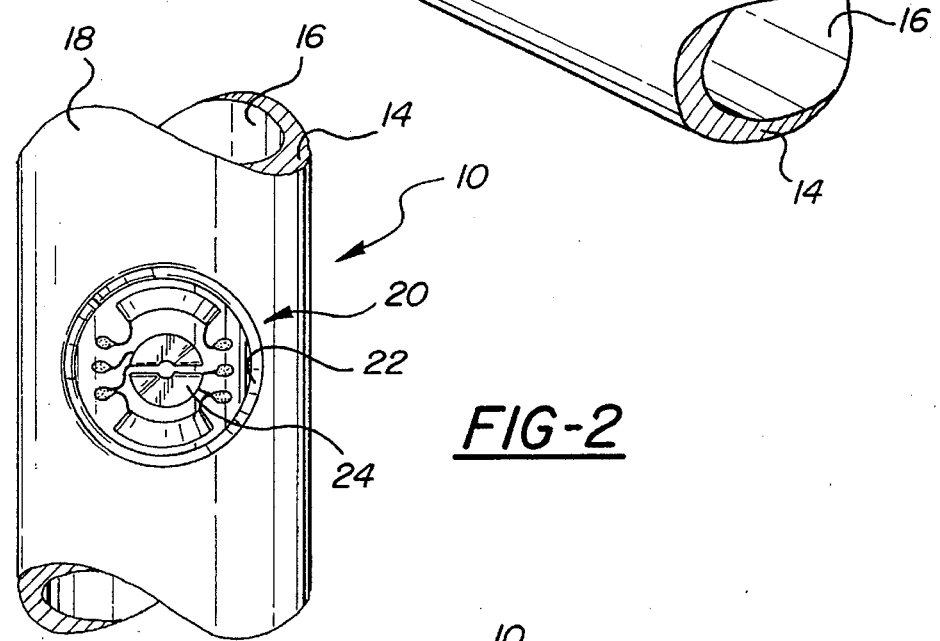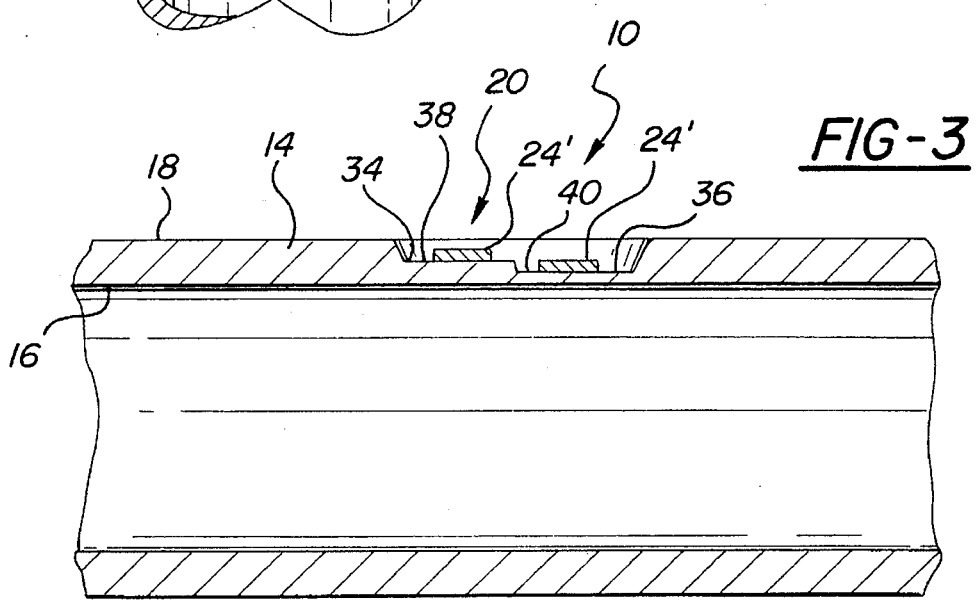

NON-INVASIVE FLUID CONDITION SENSING TRANSDUCER

TECHNICAL FIELD

This invention relates to fluid condition sensing devices, and more particularly to a transducer for in-situ, non-invasive measurement of fluid pressure and/or temperature in a cylindrical tube.

BACKGROUND ART

Fluid pressure measurement in a cylindrical tube is carried out through the use of invasive and non-invasive devices. Invasive device include elements which protrude into the fluid within the tube. These invasive devices interfere with fluid flow. Conventional non-invasive devices use a plurality of wire strain gauges disposed along axial and tangential directions of the tube. These gages are used to measure the hoop strain around the circumference of the tube and the longitudinal strain in the tube wall. Comparisons are made between the strain gauge measurements to determine fluid pressure in the tube. The use of these devices is limited to use with thin wall tubing because when used with standard sized or thick walled tubing, not enough strain can be sensed to obtain accurate measurement.

Alternatively, a non-invasive device has included a transducer body of a block shape and having a cylinder bore connectable to a piping system for fluid flow therethrough. This transducer body includes a flat milled in one portion of the block to form a thin section between the milled flat and cylinder bore. Strain gages are mounted in a grid formation on the flat and measure changes in strain resulting from the pressure of the fluid within the bore.

SUMMARY OF INVENTION

In the object of the present invention is to provide an in-situ, non-invasive fluid condition sensing device in a tube wall for sensing the condition of a fluid in the tube.

Another object of the present invention is to provide an in-situ, non-invasive fluid sensing device that is not limited by tube wall thickness.

Another object of the present invention is to provide an in-situ, non-invasive fluid pressure measuring device that eliminates the need to compare circumferential hoop stress with longitudinal stress to determine fluid pressure thereby providing a more accurate and sensitive measurement of fluid pressure in the tube.

A further object of the present invention is to provide an in-situ, non-invasive fluid temperature measuring device that quickly measures fluid temperature change in the tube.

In carrying out the above objects and other objects of the invention, the transducer includes a fluid containment device having a cylindrical side wall including an inner surface in contact with the fluid and an outer surface. A diaphragm integral with the side wall is defined by a recessed portion of the side wall and extends between the inner surface of the side wall and the recessed portion of the outer surface. An in-situ, non-invasive sensor is mounted on the recessed portion of the outer surface and senses surface conditions of the diaphragm whereby the condition of the fluid in the device is sensed.

Preferably, the fluid containment device is a cylindrical tube having a longitudinally extending axis and the recessed portion extends circumferentially less than one-half the circumference of the tube.

The recess can be formed to any geometric shape; however, single geometric shapes are preferred. In one embodiment of the invention, the sensor is a strain sensitive sensor for sensing distortion of the diaphragm, whereby fluid pressure in the tube is sensed. In an alternative embodiment of the invention, the sensor is a temperature sensitive sensor for sensing temperature of the diaphragm, whereby fluid temperature and the change in fluid temperature is sensed.

The sensors of both embodiments are covered with a protective cover or coating such as a polyurethane coating, epoxy coating, or ceramic coating. Alternatively, the cover can be made of rigid material having a shape corresponding to the cylindrical side wall and fastenable over the recessed portion to provide reinforcement for the cylindrical side wall in the vicinity of the diaphragm. Preferably such a cover includes a connector in communication with the sensor for connecting a communication link to the sensor.

A method for making an in-situ, non-invasive transducer includes the step of providing a cylindrical tube having a side wall including inner and outer wall surfaces. A diaphragm is formed in the cylindrical tube side wall by recessing the outer wall surface by electrical discharge machining. A surface condition sensor is bonded onto the diaphragm for sensing the surface condition of the diaphragm whereby the fluid condition inside the tube is sensed.

These objects and other features and advantages of the invention will be more fully understood from the following detailed description of the invention taken together with the accompanying drawings.

BRIEF DESCRIPTION OF THE DRAWINGS

FIG. 1 is a sectional perspective view of one arrangement of a tube including a diaphragm of a semi circular shape and having a sensor therein providing a transducer constructed in accordance with one embodiment the present invention;

FIG. 2 is a sectional plan view of another arrangement of a transducer including a diaphragm of a circular shape;

FIG. 3 is a sectional elevational view of another embodiment of the invention having temperature sensors mounted on two steps of a recessed portion of the tube for indicating temperature changes;

DETAILED DESCRIPTION OF THE INVENTION

Figure 4:
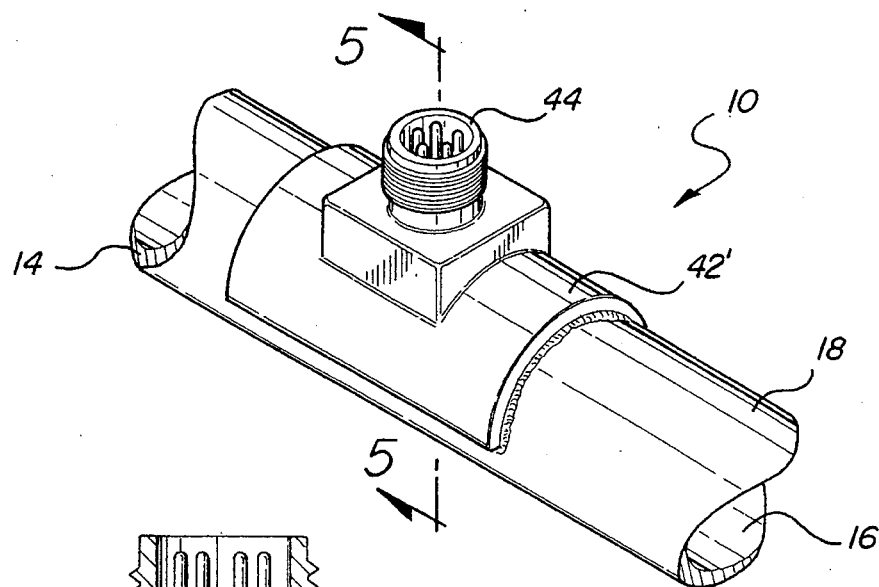
FIG. 4 is a sectional prospective view of another arrangement of the tube having a covering, including a connector, mounted over the diaphragm.

Referring now to the drawings in detail, numerical 10 generally indicates a transducer assembly in a cylindrical tube 12. As is hereinafter more fully described the transducer assembly 10 senses a fluid condition such as pressure or temperature in the tube 12.

In FIG. 1, the transducer assembly 10 includes a tube 12 having a cylindrical side wall 14 for containing and communicating a fluid through the tube. Cylindrical side wall 14 includes an inner surface 16 in contact with the fluid and an outer surface 18. A diaphragm 20 is formed in the outer surface 18 of the side wall 14. Diaphragm 20 is defined by a recessed portion 22 of the side wall 14 and has a generally cylindrical surface concentric with cylindrical side wall 14. Diaphragm 20 extends between the inner surface 16 and the recessed portion 22 of the outer surface 18. An in-situ, non-invasive sensor 24 is mounted on the recessed portion 22 of the outer surface 18 and senses the surface condition of the recessed portion 22 whereby the condition of a fluid in the tube 12 is sensed.

With further reference to FIG. 1, the diaphragm 20 illustrated in tube 12 is of a semi-circular shape. Diaphragm 20 can be formed of other geometric shapes including rectangular, square, elliptical and circular. It has been found that the simpler the geometric shape, the more efficient the sensing of the condition of the surface 22.

Referring to FIGS. 1, 2 and 4–6, the sensor 24 is a strain sensitive sensor for sensing distortion of the diaphragm 20. This distortion of the diaphragm 20 is a function of the fluid pressure in the tube 12. Sensors 24 of a metallic foil strain gage type or of a semi-conductor strain gage type can be bonded to the recessed portion 22 and calibrated as is known in the art for indicating fluid pressure in the tube 12. Known sensors 24 for sensing such distortion include Transducer-Class® strain gages and bondable compensation resisters provided by Micro-Measurements Division of Measurements Group, Inc. of Raleigh, N.C.

Referring to FIG. 2 of the drawings, the preferable diaphragm 20 shape for use with pressure sensing is circular. Recessed portion 22 includes a circular diaphragm gage pattern strain gage sensor 24 bonded thereto. Although the preferred diaphragm 20 shape is circular, it may not be a practical to form a circular shaped diaphragm 20 on a tube having a small diameter.

Figure 6:
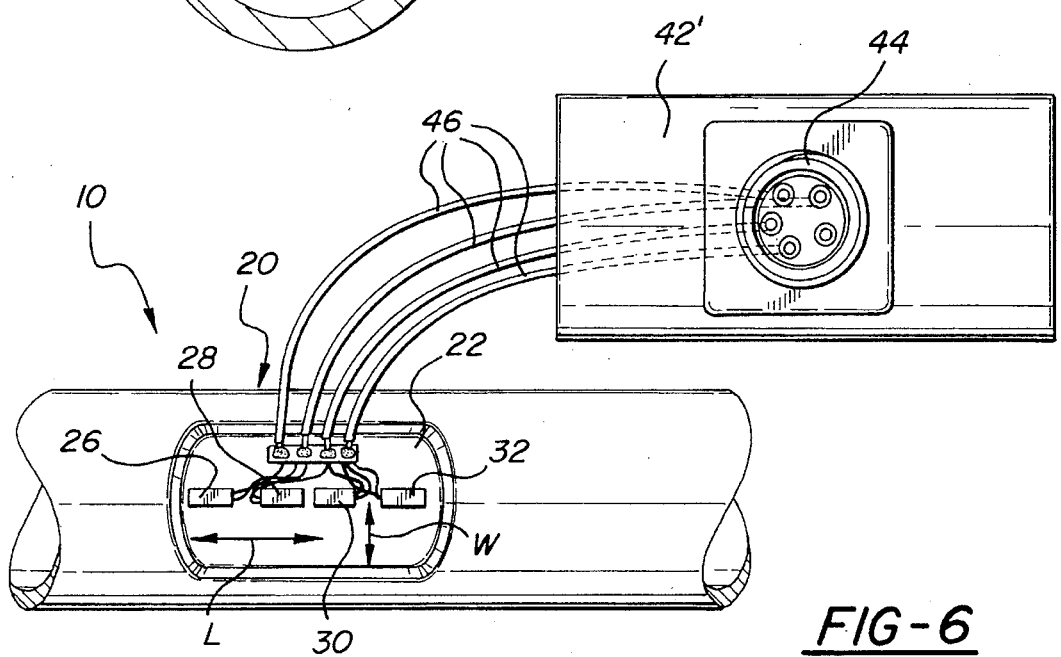
FIG. 6 is a plan view of the tube illustrating the diaphragm and a pressure sensor bonded thereto, and also illustrating the cover and connector and wiring connecting the sensor thereto.

On a tube having a small diameter, a diaphragm 20 of a generally rectangular shape as shown in FIG. 6 is desirable. Diaphragm 20 has a length L in the longitudinal direction and a width W in the circumferential direction. Although the length L in the longitudinal direction may be equal to the width W in circumferential direction, it is preferable that the length L be as much as ten times greater than the width W as known beam theory equations can be applied to the distortion values of the diaphragm 20 to provide accurate indication of the pressure within the tube 12.

Referring again to FIG. 6, the sensor 24 is a conventional wheatstone bridge type strain sensitive sensor having four metallic foil sensors 26, 28, 30 and 32 spaced along the longitudinal direction of the tube 12. For a positive pressure within tube 12, the two outer metallic foil sensors 26, 32 indicate compression sensed along the longitudinal surface of recessed portion 22 at their locations and the two inner metallic foil sensors 28, 30 indicate the tension sensed along the longitudinal surface of recessed portion 22 at their locations.

In another embodiment of the invention represented in FIG. 3, the sensor 24' is a temperature sensitive sensor for sensing the temperature of the diaphragm 20 whereby fluid temperature and changes in fluid temperature in the tube 12 are sensed. In FIG. 3, the recessed portion of the diaphragm 22 includes two steps 34 and 36 each having a temperature sensitive sensor 24' mounted thereon. The steps 34, 36 are formed along the longitudinally extending axis of the tube 12 and each step has a different thickness between its outer surface 38, 40 and the inner surface 16 of the tube. Such an arrangement provides an accurate sensing of temperature change of the fluid in the tube 12 as the temperature sensed by each temperature sensitive sensor 24' is a function of the conductivity of the tube material and the thickness of the wall portion between the inner surface 16 and respective outer surface 38, 40.

Preferably, temperature sensitive sensors 24' are copper alloyed temperature sensors such as the TG-Series Temperature Sensors and LST Matching Networks by Micro-Measurements Division of Measurements Group, Inc. are also suitable sensors.

Referring to FIGS. 1 and 4–6, the transducer 10 includes a cover 42 for covering the diaphragm 20 or recessed portion 22. The cover 42 illustrated in FIG. 1 is a protective coating that provides long-term stability to the strain sensitive sensor 24 or temperature sensitive sensor 24'. Such coatings include polyurethane compounds, epoxy compounds and ceramic compounds. Commercially available compounds include the heat-curing compounds such as Micro-Measurements M-Bond 610, AE-10/15 or 43-B. Air-drying M-Coating compounds by Micro-Measurements are also suitable.

Figure 5:
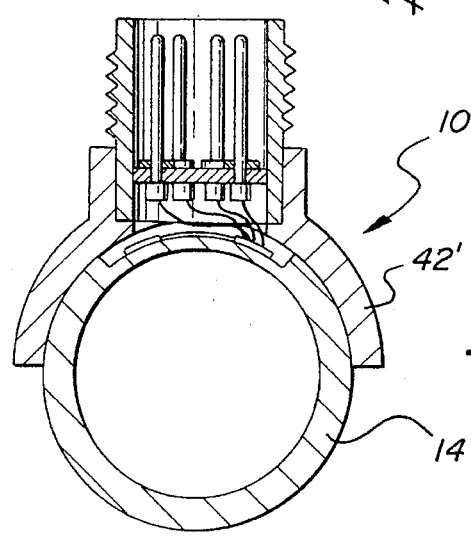
FIG. 5 is a sectional view taken along lines 5—5 in FIG. 4.

In an alterative arrangement of transducer 10 illustrated in FIGS. 4–6 the cover 42' is a rigid cover or reinforcing member of a shape corresponding to the cylindrical side wall 14 of the tube 12. Reinforcing member 42' is fastenable to the side wall 14 by conventional fastening techniques such as clamping, welding or bonding. Rigid cover 42' provides reinforcement for the cylindrical side wall in the vicinity of the diaphragm 20. In addition, as illustrated in FIGS. 4 and 5, the cover 42' includes a connector 44 that includes the electrical leads 46 to the sensor 24. In FIGS. 4–6, the connector 44 is a universal connector for connecting the sensor 24 to a desired output receiver (not shown).

The transducer 10 is formed by providing a cylindrical tube 12 having a side wall 14 including inner wall 16 and outer wall 18 surfaces. The outer wall surface of the tube 12 is eroded to form a diaphragm 20 defined by an area of reduced tube wall thickness. Preferably, the eroding of the outer wall surface 18 is provided by electro-discharge or spark erosion machining. A template formed to the shape of the desired diaphragm shape is prepared and used to erode the outer surface 18 of the side wall 14 to form the diaphragm 20. A surface condition sensor 24, 24' is mounted on the diaphragm 20 and used for sensing the surface condition of the diaphragm. The step of mounting the surface condition sensor on the diaphragm 20 includes bonding the sensor 24 to the diaphragm 20. A protective coating is applied over the mounted sensor 24 to stabilize and protect the sensor.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A transducer comprising:

a cylindrical tube having a longitudinally extending axis, a cylindrical side wall including an inner surface and also including an outer surface;

a part cylindrical diaphragm integral with said side wall and being defined by a recessed portion of said side wall extending between said inner surface and a concentric recessed portion of said outer surface;

said diaphragm extending less than one-half the circumference of said tube; and an in-situ, non-invasive sensor mounted on said recessed portion of said outer surface for sensing surface conditions of said diaphragm whereby the condition of a fluid in said tube is sensed.

2. The transducer of claim 1 wherein said diaphragm is of a generally rectangular shape having a length in the longitudinal direction and a width in the circumferential direction.

3. The transducer of claim 1 wherein said diaphragm is of a generally square shape.

4. The transducer of claim 1 wherein said diaphragm is of a generally semi-circular shape.

5. The transducer of claim 1 wherein said diaphragm is of a generally elliptical shape.

6. The transducer of claim 1 wherein said diaphragm is of a generally circular shape.

7. The transducer of claim 1 wherein said sensor is a strain sensitive sensor for sensing distortion of said diaphragm whereby fluid pressure is sensed.

8. The transducer of claim 7 wherein said strain sensitive sensor is a metallic foil strain gage.

9. The transducer of claim 7 wherein said strain sensitive sensor is a metallic wire strain gage.

10. The transducer of claim 7 wherein said strain sensitive sensor is a semi-conductor strain gage.

11. The transducer of claim 1 wherein said sensor is a temperature sensitive sensor for sensing temperature of said diaphragm whereby fluid temperature is sensed.

12. The transducer of claim 11 wherein said temperature sensitive sensor is a resistive temperature device.

13. The transducer of claim 1 further including a cover for covering said recessed portion.

14. The transducer of claim 13 wherein said cover is a reinforcing member of a partially cylindrical shape corresponding to said cylindrical side wall and fastenable thereto over said recessed portion to provide reinforcement for said cylindrical side wall in the vicinity of said diaphragm.

15. A transducer comprising:

a fluid containment device having a cylindrical side wall including an inner surface and also including an outer surface;

a part cylindrical diaphragm integral with said side wall and being defined by a recessed portion of said side wall extending between said inner surface and a concentric recessed portion of said outer surface;

said diaphragm being of a generally rectangular shape having a length in the longitudinal direction and a width in the circumferential direction wherein said length is generally in the range of 1 to 10 times said width; and an in-situ, non-invasive sensor mounted on said recessed portion of said outer surface for sensing surface conditions of said diaphragm whereby the condition of a fluid in said device is sensed.

16. A transducer comprising:

a fluid containment device having a cylindrical side wall including an inner surface and also including an outer surface;

a diaphragm integral with said side wall and being defined by a recessed portion of said side wall extending between said inner surface and a recessed portion of said outer surface; and an in-situ, non-invasive copper alloy temperature sensor mounted on said recessed portion of said outer surface for sensing temperature of said diaphragm whereby the temperature of a fluid in said device is sensed.

17. A transducer comprising:

a fluid containment device having a cylindrical side wall including an inner surface and also including an outer surface;

a diaphragm integral with said side wall and being defined by a recessed portion of said side wall extending between said inner surface and a recessed portion of said outer surface;

said recessed portion including first and second steps along said longitudinally extending axis, each step having a different thickness; and an in-situ, non-invasive temperature sensitive sensor mounted on each said step of said recessed portion for sensing temperature of said diaphragm whereby temperature transients in the fluid are sensed.

18. A transducer comprising:

a fluid containment device having a cylindrical side wall including an inner surface and also including an outer surface;

a diaphragm integral with said side wall and being defined by a recessed portion of said side wall extending between said inner surface and a recessed portion of said outer surface;

an in-situ, non-invasive sensor mounted on said recessed portion of said outer surface for sensing surface conditions of said diaphragm whereby the condition of a fluid in said device is sensed; and a cover for covering said recessed portion wherein said cover includes a connector in communication with said sensor for connecting a communication link thereto.

* * * * *